US008044987B2

(12) United States Patent
Kamata

(10) Patent No.: US 8,044,987 B2
(45) Date of Patent: Oct. 25, 2011

(54) PRINTER WITH A PRINT HEAD URGED TO COME INTO CONTACT WITH A PLATEN ROLLER

(75) Inventor: Shigeyuki Kamata, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 954 days.

(21) Appl. No.: 11/774,993

(22) Filed: Jul. 9, 2007

(65) Prior Publication Data

US 2008/0024585 A1 Jan. 31, 2008

(30) Foreign Application Priority Data

Jul. 28, 2006 (JP) ................................ 2006-206301

(51) Int. Cl.
*G01D 15/10* (2006.01)

(52) U.S. Cl. ....................................... 347/220; 347/198

(58) Field of Classification Search .................. 400/613, 400/693, 621, 663, 58, 208; 347/220, 197, 347/198

See application file for complete search history.

(56) References Cited

U.S. PATENT DOCUMENTS

| | | | | |
|---|---|---|---|---|
| 5,746,520 | A * | 5/1998 | Kohira | 400/120.01 |
| 6,249,302 | B1 | 6/2001 | Sekiya | |
| 6,398,434 | B1 * | 6/2002 | Corrigan, Jr. | 400/120.17 |
| 6,765,602 | B2 * | 7/2004 | Mori | 347/220 |
| 7,042,480 | B2 * | 5/2006 | Ito | 347/220 |
| 7,425,973 | B2 * | 9/2008 | Han | 347/187 |
| 2006/0082636 | A1 * | 4/2006 | Maruyama | 347/197 |
| 2006/0290771 | A1 * | 12/2006 | Han | 347/220 |

FOREIGN PATENT DOCUMENTS

| | | |
|---|---|---|
| EP | 0 324 129 | 7/1989 |
| EP | 1 052 107 | 11/2000 |
| EP | 1 323 535 | 7/2003 |
| JP | 4-16375 | 1/1992 |
| JP | 2000-318260 | 11/2000 |
| JP | 2004-188787 | 7/2004 |

OTHER PUBLICATIONS

European Search Report for corresponding European Patent Application Serial No. 07 01 4609, dated Nov. 2, 2007.

* cited by examiner

*Primary Examiner* — Charlie Peng

(74) *Attorney, Agent, or Firm* — Brinks Hofer Gilson & Lione

(57) ABSTRACT

The invention provides a printer in which a lock lever comes into contact with a roller shaft of a platen roller in upper open grooves disposed in a frame and controls the position of the upper portion of the upper open grooves so that the platen roller is supported in a predetermined position of the frame and reliably comes into contact with a thermal head disposed to be opposite to the platen roller, and a lock lever member disposed so as to position a joint member for joining the upper open grooves and close to a bottom plate of the frame in a print portion in which the platen roller and a thermal head come into pressure contact with each other.

2 Claims, 3 Drawing Sheets

PRINTER WITH A PRINT HEAD URGED TO COME INTO CONTACT WITH A PLATEN ROLLER

This application claims the benefit of priority under 35 U.S.C. §119 to Japanese Patent Application No. 2006-206301, filed Jul. 28, 2006, which is hereby incorporated by reference in its entirety.

BACKGROUND OF THE INVENTION

1. Field of the Invention

The present invention relates to a printer, and particularly to the printer including a device in which a print head supports a platen which is detachable so that the print head can come into pressure contact with the platen.

2. Description of the Related Art

The known printer in which a platen roller is detachable, print paper can be easily loaded, and the like has been used.

For example, in the printer disclosed in JP-A-2000-318260, the platen roller has a roller shaft and is retained in U-shaped grooves (hereinafter, referred to as upper open grooves) which is formed in a pair of lateral plates formed in the right and left of a frame and of which the upper portion is open. In addition, the roller shaft is controlled in the right, left, and lower directions in position by the upper open grooves and controlled in the upper direction in position by a lock lever disposed in both the lateral plates of the frame.

The lock levers are lever members disposed to be rotatable around the rotation point of the frame and are together joined by the joint member with a plate shape to constitute the lock lever member. The lock lever member is disposed in the frame so as to allow the joint member to be positioned in the opposite side of the platen roller of a thermal head, which is the print head disposed to come into contact with the platen roller. In addition, a spring member urging the thermal head retention plate and the joint member to move away is mounted between thermal head retention plates which bear the joint member and the thermal head.

The spring member applies an urging force for locking a roller shaft of the platen roller between the lock lever and the upper open groove of the frame. In addition, the spring member also applies the urging force for bringing the thermal head into pressure contact with the platen roller in a state where the roller shaft of the platen roller is locked between the upper open groove of the frame and the lock lever.

As described above, the lock lever member is disposed in the frame so that the joint member is positioned in the opposite side of the platen roller of the thermal head. Such a configuration does not meet the recent requirement of a decrease in size.

In addition, one spring member allows the lock lever to lock the roller shaft and urges the thermal head to come into pressure contact with the platen roller. Consequently, the one spring member cannot adjust only the spring load required to lock the lock lever and in the roller shaft for itself, for example.

SUMMARY OF THE INVENTION

An object of the present invention is to provide a printer capable of independently adjusting a lock force of a lock lever for a roller shaft and a pressure contact force of a thermal head for a platen roller as well as providing a miniaturized printer.

According to an aspect of the invention, there is provided a printer including a print head; a platen roller with which the print head is urged to come into pressure contact by a first spring member and which has a roller shaft; a motor capable of rotating the platen roller; a frame in which upper open grooves that support the platen roller are disposed on a pair of lateral plates thereof opposite to each other; and a lock lever member in which a pair of lock levers that controls a position of an open side of the roller shaft urged by a second spring member to be normally present in the upper open grooves and to be supported in the upper open grooves is joined to a joint member, and which is rotatably supported by a rotation shaft axially supported by an shaft hole disposed in the pair of lateral plates of the frame; wherein the lock lever member is disposed so as to position the joint member close to a bottom plate of the frame in a print portion in which the platen roller and a thermal head come into pressure contact with each other.

In this manner, it is possible to reduce a printer in size by disposing the lock lever member so as to position the joint member close to the bottom plate of the frame in the print portion in which the platen roller and the thermal head come into pressure contact with each other. In addition, it is possible to independently adjust a lock force of the lock lever for the roller shaft and a pressure contact force of the thermal head for the platen roller.

The joint member may be a longitudinal plate shaped member and a reinforcing rib that extends in a longitudinal direction may be disposed in the center in the width direction of the joint member.

In this manner, it is possible to increase strength of the joint member constituted by the plate-shaped member so as to suppress bending deformation by forming the reinforcing rib in a longitudinal direction of the joint member. Consequently, it is possible to reliably lock the roller shaft of the platen roller.

In a printer according to the invention, it is possible to independently adjust a lock force of a lock lever for a roller shaft and a pressure contact force of a thermal head for a platen roller as well as realizing a miniaturized printer. Consequently, it is possible to surely support the platen roller in a predetermined position of a frame and to satisfactorily bring the platen roller into contact with a thermal head disposed to be opposite to the platen roller.

DESCRIPTION OF THE PREFERRED EMBODIMENTS

A printer according to an embodiment includes a feeding portion which is made of a resin material and feeds print paper, an ejecting portion which ejects print paper, a printer chassis (not shown) in which a wiring board is disposed and an opening is formed. In addition, a terminal for supplying an electric power to a motor, a control board, and the like described below and inputting input print data is formed in the wiring board.

A platen roller, a lock lever member, a head retention member, a thermal head which is a kind of a print head, a deceleration device, a frame which movably supports the head retention member and rotatably supports a roller shaft of the platen roller, a motor which has a drive shaft and rotatably drives the platen roller with the deceleration device interposed therebetween, and a print paper guide are generally disposed in the printer chassis.

Figure 1:
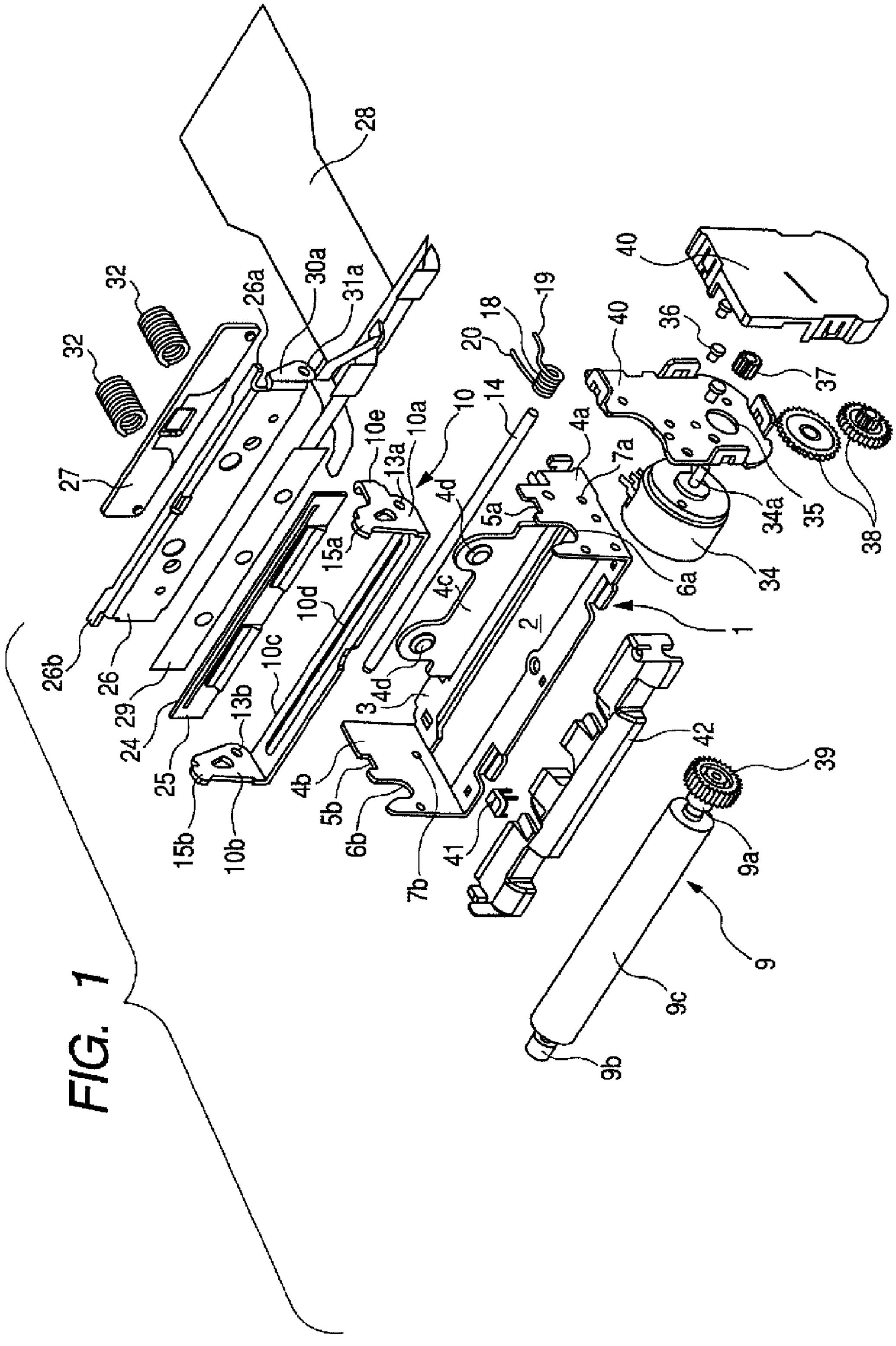
FIG. 1 is an exploded perspective view showing a configuration of the major portions of a printer according to an embodiment.
Figure 2:
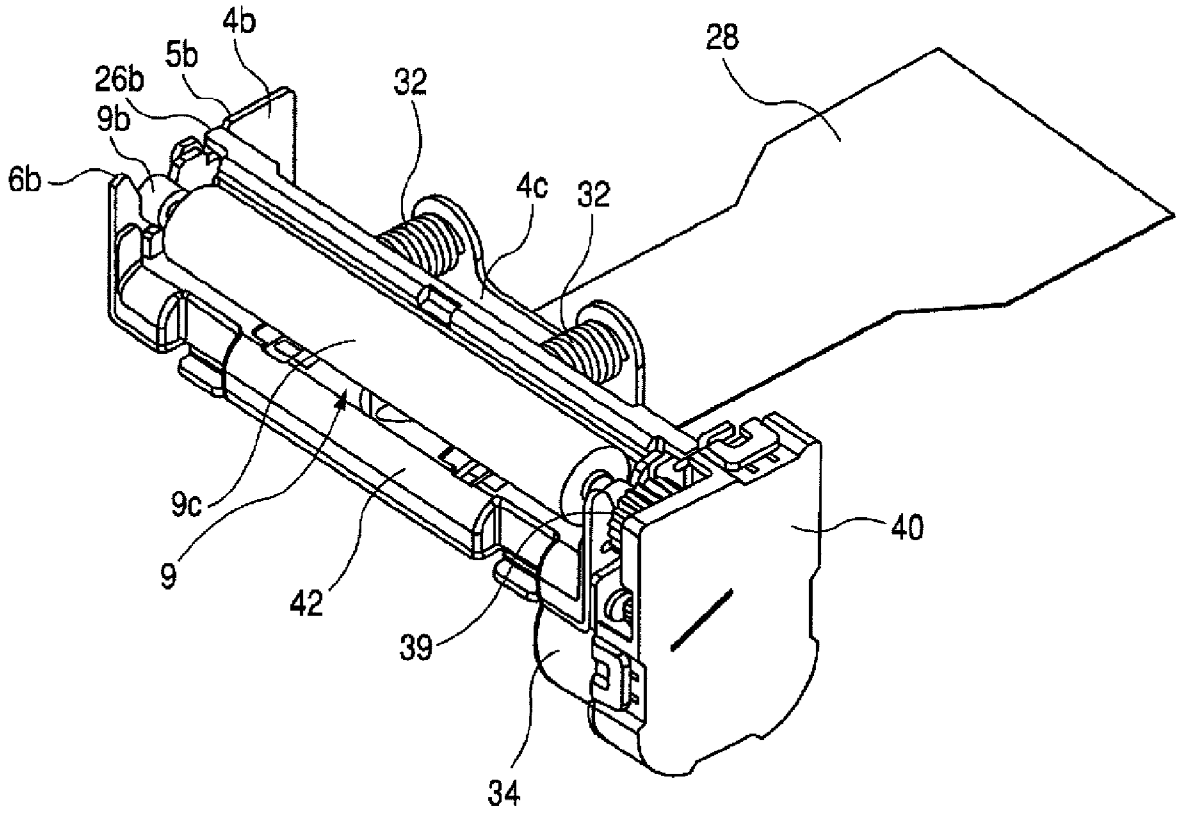
FIG. 2 is a perspective view showing the assembled printer in FIG. 1.

FIG. 1 is an exploded perspective view showing each member of the frame of the printer according to the embodiment. FIG. 2 is a perspective view showing the frame of the assembled printer.

A frame 1 disposed within the printer chassis has a bottom plate 3 of which an opening portion 2 with a rectangular shape is formed at the center. A pair of lateral plates 4*a* and 4*b* opposite to each other is formed in the right and left of the bottom plate 3. In each substantial center of the upper end portions of the pair of the lateral plates 4*a* and 4*b*, -shaped notches (hereinafter, referred to as -shaped notches) 5*a* and 5*b* are formed. In positions adjacent to the -shaped notches 5*a* and 5*b*, U-shaped grooves 6*a* and 6*b* (hereinafter referred to as upper open grooves) of which the upper portions are open are formed. In addition, in the lower portions of the -shaped notches 6*a* and 6*b* of the pair of the lateral plates 4*a* and 4*b*, shaft holes 7*a* and 7*b* in which a rotation shaft 14 is axially supported to rotate the lock lever member and the head retention plate 26 described below are formed.

In the upper open grooves 6*a* and 6*b*, roller shafts 9*a* and 9*b* of the platen roller 9 disposed in a concentric shape in both ends of a roller body 9*c* are each retained, so that the platen roller 9 is axially supported between the lateral plates 4*a* and 4*b* so as to be rotatable.

In the printer according to the embodiment, a pair of lock levers 10*a* and 10*b* which prevent the roller shafts 9*a* and 9*b* supported in the upper open grooves 6*a* and 6*b* from coming out are joined to a joint member 11*c* with a plate shape to be incorporated into a lock lever member 10, which is disposed within the pair of the lateral plates 4*a* and 4*b* of the frame 1.

According to the embodiment, the pair of the lock levers 10*a* and 10*b* with a substantially right triangle shape are formed. In addition, each substantially right-angled corner portion is positioned below the platen roller 9 in each of the lock levers 10*a* and 10*b*, so that each bottom side constituted by each corner portion is joined to the joint member 10*c* in a long plate shape. In addition, according to the embodiment, a reinforcing rib 10*d* for preventing the lock lever member 10 from being deformed extends in a longitudinal direction to be formed in the center of the width direction of the joint member 10*c*.

In the upper end portions of each the lock levers 10*a* and 10*b*, locking projections 15*a* and 15*b* for locking the platen roller 9 in the roller shafts 9*a* and 9*b* are formed.

The locking projections 15*a* and 15*b* according to the embodiment have a slope guiding portion 15*c* for guiding the roller shafts 9*a* and 9*b* so as to be slid into upper open grooves 6*a* and 6*b*, and a slope locking portion 15*d* for locking the outer periphery of the roller shafts 9*a* and 9*b*.

In the corner portions of the lock levers 10*a* and 10*b*, which are positioned in the opposite side of the platen roller, shaft holes 13*a* and 13*b* in which the lock levers 10*a* and 10*b* are rotatable are formed. In a state where the joint member 10*c* is positioned within the opening portion 2 formed in the bottom plate 3 of the frame 1 and the extension portion 12 extends in a direction of the upper open grooves 6*a* and 6*b*, the lock lever member 10 is axially supported to be rotated by the rotation shaft 14 so that the shaft holes 13*a* and 13*b* are matched in position with the shaft holes 7*a* and 7*b* formed in each lateral plates 4*a* and 4*b* of the frame 1. That is, the lock lever member 10 is disposed so that the joint member 10*c* is positioned on the bottom plate 3 of the frame 1 in a print portion in which the platen roller 9 comes into pressure contact with a thermal head 24 described below.

Figure 3:
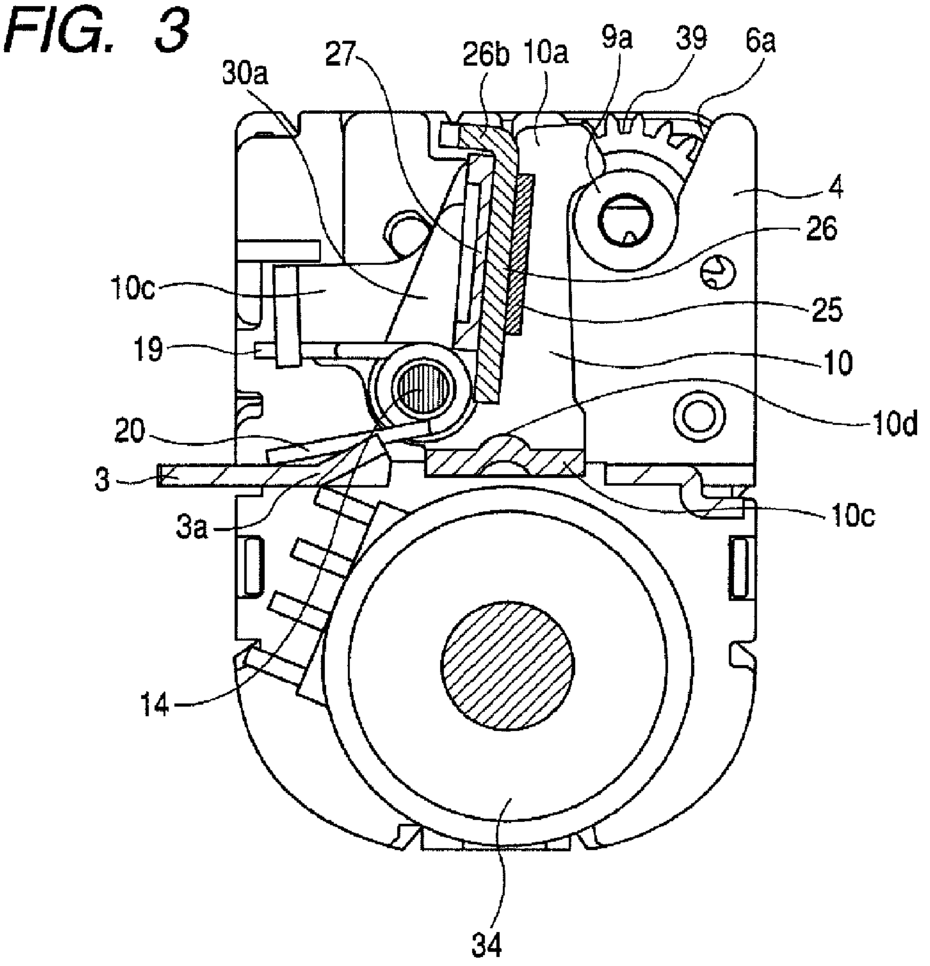
FIG. 3 is a sectional view showing one side of a plate with the major portions of the assembled printer in FIG. 1.

In the center of the opposite side of the platen roller of the lock lever 10*a*, a lock piece 10*e* in which the some end portion of the bottom plate 3 of the frame 1 is bent to be inclined inwardly to the frame 1 and which locks some end portion of the lock spring 18, which is a second spring member, disposed between the a spring bearing portion 3*a* and the some end portion is formed. As shown in FIG. 3, the lock spring 18 is a wound coil spring. One locking end portion 19 with a substantially straight line-shape is fixed to the lock piece 10*e* in a state where the rotation shaft 14 penetrates through the wound coil spring. The other locking end portion 20 comes into contact with the spring bearing 3*e* so that the tension for urging the lock lever member 10 to the platen roller 9 is applied.

That is, the lock lever member 10 is urged to the platen roller 9 by the lock spring 18 disposed in a state where spring bearing 3*a* and the lock piece 10*e* are under the influence of the tension. The locking projections 15*a* and 15*b* come into contact with the upper open grooves 6*a* and 6*b* so as to be locked in the roller shafts 9*a* and 9*b*.

Figure 4:
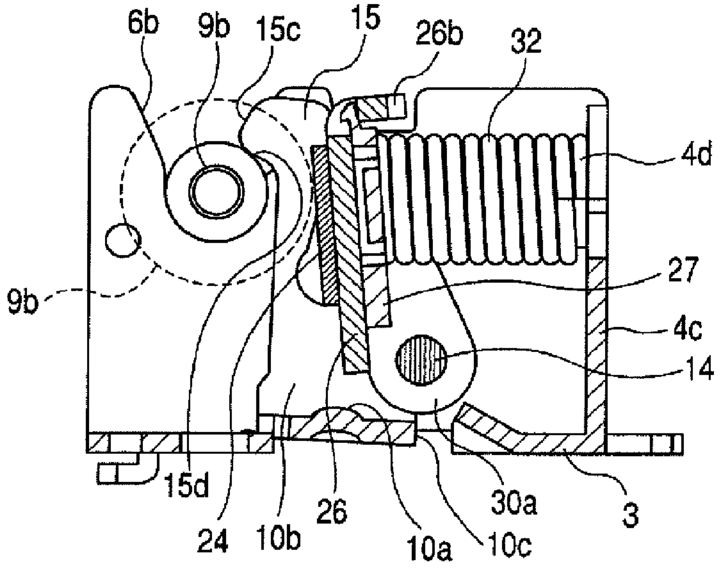
FIG. 4 is a sectional view showing the other side of a plate with the major portions of the assembled printer in FIG. 1.

In the ⊐-shaped notches 5*a* and 5*b*, slide shafts 26*a* and 26*b* of a head retention plate 26 supporting the thermal head 25, where a plurality of heater elements 24 is disposed in a longitudinal direction as shown in FIG. 4, is born to be slid. In addition, the slide shafts 26*a* and 26*b* are disposed to bring the heater elements 24 into pressure contact with the outer periphery of the roller body 9*c* of the platen roller 9.

Specifically, the head retention plate 26 is a plate-shaped member extending in the arrangement direction of the heater elements 24 of the thermal head 25. The thermal head 25 is disposed in the front surface of the head retention plate 26 with adhesive seal material 29, which is capable of adhering both sides, interposed therebetween, and a spring pressure plate 27 is disposed in the back surface. A flexible wiring board 28 for connecting a drive control unit or a power supply (not shown) is connected to the thermal head 25.

In the lower portion of the lateral plates 30*a* and 30*b* of the head retention plate 26, the shaft holes 31*a* and 31*b* in which the rotation shaft 14 for rotating the upper portion of the head retention plate 26 is axially supported are formed. The head retention plate 26 is axially supported within the lock lever member 10 so as to be rotated by the rotation shaft 14 by matching the shaft holes 31*a* and 31*b*, the shaft holes 7*a* and 7*b* formed in each of the lateral plates 4*a* and 4*b* of the frame 1, and the shaft holes 13*a* and 13*b* of the lock lever member 10 in position.

In the back surface of the spring pressure plate 27, two head fitting portions 27*c* with a convex shape for fitting each one end of two compressed coil springs 32 described below, which are first spring members, are formed. In addition, in an end plate 4*c* of the frame 1 formed to be opposite to the back surface of the spring pressure plate 27, two wall fitting portions 4*d* with a convex shape for fitting the other end of the compressed coil spring 32 are formed. The two coil springs 32 for applying tension between the head fitting portions 27*c* and the wall fitting portions 4*d* to the rotation shaft 14 axially supported in the shaft holes 31*a* and 31*b* so as to normally rotate the upper portion of the thermal head retention plate 26 toward the platen roller 9 are disposed.

The head retention plate 26 is urged toward the platen roller 9 by the compressed coil springs 32 so that each heater element 24 of the thermal head 25 comes into pressure contact with the platen roller 9. Consequently, a pressure contact force of the thermal head 25 for the platen roller 9 can be simply adjusted by changing the spring pressure of the compressed coil springs 32. When the thermal head 25 comes into pressure contact with the platen roller 9, the slide shafts 26*a* and 26*b* slide in each of the ⊐-shaped notches 5*a* and 5*b*. A position in which each heater element 24 of the thermal head 25 and the platen roller 9 come into pressure contact with each other is the print portion of the printer.

In the lateral plate 4*a*, a gear box 40 housing a deceleration device is fixed by screw cramps.

On the back surface of the bottom plate 3 of the frame 1, the drive shaft 34*a* projects from an opening 40*a* to the inside of the gear box 40 so that a motor 34 with the drive shaft 34*a* for rotatably driving the platen roller 9 is disposed. Within the gear box 40, a drive gear 37 is retained in the drive shaft 34*a* of the motor 34 and an intermediate gear group 38, which is the deceleration device, engages with the drive gear 37. A platen gear 39 retained in the roller shaft 23 of the platen roller 22 engages with the intermediate gear group 38. In addition, when the motor is rotatably driven, the drive gear 37 and the intermediate gear group 38 rotate, and then the platen gear 39 rotates. In the end, the platen roller 9 rotates.

In one side in which the end plate 4*c* of the bottom plate 3 of the frame 1 is formed and in the opposite side, a paper guide member 42 for guiding a conveyance path of print paper (not shown) fed in a printing process and for keeping a paper detection sensor 41 detecting print paper is disposed.

The thermal head 25 and the platen roller 9 can print images such as characters on the print paper (not shown) conveyed to the print portion in which the thermal head 25 and the platen roller 9 come into pressure contact with each other.

In the rear of the head retention plate 26, a cam member (not shown) capable of releasing the pressure contact of the platen roller 9 and the thermal head 25 is disposed. An operation member capable of operating the cam member is connected to the cam member. By rotating the operation member, the thermal head 25 can be detached from the platen roller 9 against the urging force of the compressed coil springs 32.

In such a printer, for example, when print paper is set and the platen roller 9 is separated from the printer, the platen roller 9 can be extracted while being raised. In this case, the roller shafts 9*a* and 9*b* of the platen roller 9 come into contact with the locking projections 15*a* and 15*b* and rotate the lock levers 10*a* and 10*b* on the shaft holes 13*a* and 13*b*, which are rotation points, in a clockwise direction in FIG. 3 and in a counterclockwise direction in FIG. 4.

According to the embodiment, since the pair of the lock levers 10*a* and 10*b* is incorporated into the joint portion 10C, both of the lock levers 10*a* and 10*b* further press the lock spring 18 disposed under the influence of tension. Consequently, the lock levers 10*a* and 10*b* rotate against a repulsive force of the lock spring 18.

In this manner, the platen roller 9 is separated from the frame of the printer by releasing the engagement of the locking projections 15*a* and 15*b* of the lock lever 10 from the roller shafts 9*a* and 9*b* and opening the upper portions of the roller shafts 9*a* and 9*b* in the upper open grooves 6*a* and 6*b*.

After the platen roller 9 is separated from the frame, the lock lever member 10 is rotated by the urging force of the lock spring 18 in the clockwise direction in FIG. 3 and in the counterclockwise direction in FIG. 4 so that the locking projections 15*a* and 15*b* are positioned in the upper open grooves 6*a* and 6*b*.

When the platen roller 9 is mounted in the printer, the roller shafts 9*a* and 9*b* come into contact with the slope guiding portions 15*c* of the locking projections 15*a* and 15*b* present in the upper open grooves 6*a* and 6*b*, and is slid in the back direction of the upper open grooves 6*a* and 6*b*. In this manner, while the lock lever member 10 further presses the lock spring 18 disposed under the influence of the tension against the repulsive force of the lock spring 18, the lock levers 10*a* and 10*b* rotate on the shaft holes 13*a* and 13*b* in the clockwise direction in FIG. 3 and in the counterclockwise direction in FIG. 4 and open the upper portions of the upper open grooves 6*a* and 6*b*. Consequently, the roller shafts 9*a* and 9*b* are axially supported in the upper open grooves 6*a* and 6*b* and the slope locking portions 15*d* are locked in the roller shafts 9*a* and 9*b*.

In the printer according to the embodiment, the urging force of the lock spring 18 and the urging force of the compressed coil spring 32 can be each adjusted by using the individual spring member. Consequently, it is possible to individually adjust the lock force of the lock levers 10*a* and 10*b* for the rollers shafts 9*a* and 9*b* and the pressure contact force of the thermal head 24 for the platen roller 9.

Consequently, it is possible to reliably support the platen roller 9 in a predetermined position of the frame 1 and to simply detach the platen roller 9 by adjusting the urging force of the lock spring 18. In addition, it is possible to satisfactorily bring the platen roller 9 into contact with the thermal head 24 by adjusting the urging force of the compressed coil spring 32.

Since the joint member 10*c* of the lock lever member 10 is positioned on the bottom plate 3 of the frame 1 in the print portion in which the platen roller 9 and the thermal head 25 come into contact with each other, it is possible to reduce the printer in size.

The invention is not limited to the embodiment, but can be modified into various forms, if necessary.

What is claimed is:

1. A printer comprising:

a platen roller including a pair of roller shafts;

a frame including a pair of lateral plates opposite to each other and defining upper open grooves for supporting the roller shafts of the platen roller and shaft holes;

a rotation shaft axially inserted through the shaft holes of the frame;

a print head that is rotatably supported by the rotation shaft;

a first spring that urges the print head to come into pressure contact with the platen roller;

a motor capable of rotatably driving the platen roller;

a lock lever member comprising a pair of lock levers and a joint member joined to the pair of lock levers, where the lock lever member is rotatably supported by the rotation shaft; and a second spring that urges the lock lever member to come into pressure contact with the roller shafts of the platen roller, wherein the pressure contact between the print head and the platen roller is adjustable by the first spring, the pressure contact between the lock lever member and the roller shafts of the platen roller being adjustable by the second spring independent of the pressure contact between the print head and the platen roller;

wherein the lock levers are provided with locking projections each including a slope guiding portion and a slope locking portion, when the platen roller is mounted in the upper open grooves, the roller shafts of the platen roller being guided by the slope guiding portion toward the slope locking portion and into the upper open grooves such that the slope locking portion contacts an outer periphery of the roller shaft and such that the slope locking portion and the lateral plates of the frame jointly lock the roller shafts between the slope locking portion and the lateral plates of the frame, the slope guiding portion being disposed above the roller shafts of the platen roller to partially close the upper open grooves so as to control a position of the open side of the roller shaft, when the platen roller is moved out of the upper open grooves, the roller shafts pushing the slope locking portion against an urging force of the second spring and being guided by the slope locking portion toward the slope guiding portion.

2. The printer according to claim 1, wherein the lock lever member is disposed so as to position the joint member close to the frame in a depth direction of the upper open groove in a print portion in which the platen roller comes into pressure contact with the print head.

* * * * *